United States Patent [19]

Cunningham et al.

[11] 3,920,457

[45] Nov. 18, 1975

[54] PHOTOGRAPHIC LEUCO-DYE COMPOSITIONS CONTAINING REDUCTONES AS STABILIZERS

[75] Inventors: Michael Paul Cunningham; William Charles Farley; Richard Cornelius Van Hanehem, all of Rochester, N.Y.

[73] Assignee: Eastman Kodak Company, Rochester, N.Y.

[22] Filed: Mar. 4, 1974

[21] Appl. No.: 448,177

[52] U.S. Cl. ............................... 96/90 R; 96/90 PC
[51] Int. Cl.² ........................................... G03C 1/52
[58] Field of Search .................. 96/90 R, 88, 90 PC

[56] References Cited
UNITED STATES PATENTS

| | | | |
|---|---|---|---|
| 2,936,308 | 5/1960 | Hodge | 96/66.4 |
| 3,042,515 | 7/1962 | Wainer | 96/90 R |
| 3,351,467 | 11/1967 | Sprague et al. | 96/90 R |
| 3,582,342 | 6/1971 | Itano et al. | 96/90 R |
| 3,615,568 | 10/1971 | Jenkins | 96/90 R |

*Primary Examiner*—Won H. Louie, Jr
*Attorney, Agent, or Firm*—A. H. Rosenstein

[57] ABSTRACT

Certain reductones are added to photographic print-out compositions containing leuco dyes whereby coating solutions of such compositions are stabilized against discoloration prior to coating and dark thermal reactions leading to background coloration on aging of coated stock are suppressed.

8 Claims, No Drawings

PHOTOGRAPHIC LEUCO-DYE COMPOSITIONS CONTAINING REDUCTONES AS STABILIZERS

BACKGROUND OF THE INVENTION

1. Field of the Invention

This invention relates to the stabilization prior to use of photosensitive compositions which form color when exposed to radiation.

2. Description of the Prior Art

In many photographic applications, e.g., lithographic plates, photoresists and the like, it is highly desirable to have a visible indication of exposure before development. This can be a convenience in many instances, such as in step and repeat exposure operations, where the coated elements are stored for some time between exposure and development or where it is desirable to evaluate the image achieved by exposure before development. To provide this capability it is frequently the practice to include in the coating composition an indicator dye that is capable of either printout or bleachout on exposure of the radiation-sensitive coating produced therefrom. A wide variety of exposure indicator dyes are known to be employable in the art. These exposure indicator dyes include photochromic dyes such as spirobenzopyrans (e.g. 3′,3′-dimethyl-6-nitro-1′-phenylspiro[2H-1]benzopyran-2,2′-indoline, 5′-methoxycarbonyl-8-methoxy-1′,3′,3′-trimethyl-6-nitrospiro[2H-1]benzopyran-2,2′-indoline, and the like); pH sensitive dyes such as bis[4,4′-bis(dimethylamino)benzhydrol] ether useful in combination with certain activators; and cyanine dyes such as disclosed in Mitchell U.S. Pat. No. 3,619,194.

Especially useful in this respect are processes wherein various leuco dyes are oxidized to the corresponding dyes utilizing organic polyhalogen compounds or oxidizing agents (Phot. Sci. Eng., 5, 98–103, 1961; U.S. Pat. No. 3,042,515). In a typical process of this type, a mixture of diphenylamine and carbon tetrabromide is exposed to a pattern of ultraviolet radiation. The radiation causes the halohydrocarbon to decompose and the decomposition products oxidize the diphenylamine to the corresponding blue dye. U.S. Pat. No. 3,615,568 discloses elements where the halohydrocarbons are replaced by photooxidants containing a heterocyclic nitrogen atom which is substituted by an alkoxy or an acyloxy group.

A number of reductones and methods for making them are described in U.S. Pat. No. 2,936,308. It is pointed out that, by virtue of the arrangement of the enolic hydroxyl groups with respect to the unsaturated linkages, these compounds possess characteristically strong reducing power and have found wide-spread use as reducing agents, antioxidants, photographic developers and medicinals.

U.S. Pat. No. 3,042,515, referred to above, discloses that discloration of leuco dyes on exposure to air or oxygen in the presence of light or heat or both can be eliminated by the addition of an organic reducing agent which is a benzene ring having a hydroxyl group attached to it, provided that at least another hydroxyl group or amino group is attached to the ring in another position, e.g., hydroquinone, catechol, resorcinol, hydroxy hydroquinone, phloroglucinol and aminophenols such as o-aminophenol and p-aminophenol.

SUMMARY OF THE INVENTION

The present invention comprises the use of certain reductones as stabilizers in leuco dye-containing photographic elements and precursors thereof.

More particularly, the present invention comprises an improvement in a leuco dye-containing photographic element which prints out to form an image upon exposure to radiation or with leuco dye-containing precursor for said element, wherein the improvement comprises a stabilizer selected from the group consisting of reductones of the structure:

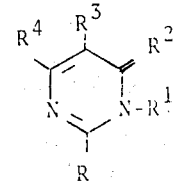

and

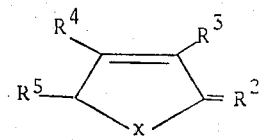

wherein x is oxygen or alkylene, R and $R^1$ are independently selected from the group consisting of hydrogen and alkyl, $R^2$ is oxygen or an imino group, $R^3$ and $R^4$ are independently selected hydroxyl or amino groups, but at least one of $R^3$ and $R^4$ must be hydroxyl, $R^5$ is aryl, substituted aryl or

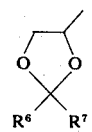

wherein $R^6$ and $R^7$ are independently selected alkyl groups; whereby said precursor is stabilized against discoloration prior to coating and dark thermal reactions leading to background coloration of said element on aging or suppressed.

In another aspect, the present invention comprises a process for stabilizing a leuco dye-containing photographic element which prints out to form an image upon exposure to radiation or with a leuco dye-containing precursor for said element, which process comprises adding to said element or precursor a stabilizer selected from the group consisting of reductones of the structure:

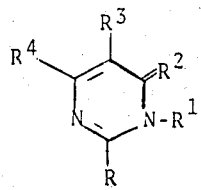

and

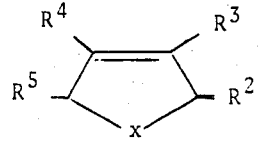

wherein x is oxygen or alkylene, R and R¹ are independently selected from the group consisting of hydrogen and alkyl, R² is oxygen or an imino group, R³ and R⁴ are independently selected hydroxyl or amino groups, but at least one of R³ and R⁴ must be hydroxyl, R⁵ is aryl, substituted aryl or

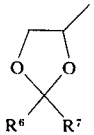

wherein R⁶ and R⁷ are independently selected alkyl groups; whereby said precursor is stabilized against discoloration prior to coating and dark thermal reactions leading to background coloration of said element on aging are suppressed.

DESCRIPTION OF THE PREFERRED EMBODIMENTS

The reductones employed in the practice of this invention are known compounds. As pointed out above, they have the structure:

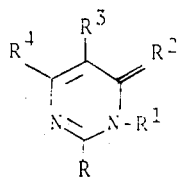

or

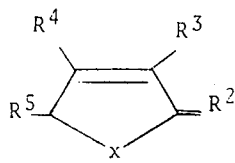

In these formulas, x is oxygen or alkylene, especially alkylene having one or two carbon atoms, i.e., methylene or ethylene. Methylene is preferred. R and R¹ are independently selected and can be either hydrogen or alkyl; where alkyl, it is preferably one having from one to four carbon atoms, e.g., methyl, ethyl, propyl, butyl and isomers thereof. R² is oxygen or an imino group, i.e. =NH. R³ and R⁴ are independently selected and are hydroxyl or amino groups, but at least one of R³ and R⁴ must be hydroxyl. Where R³ or R⁴ are amino, they can be primary, secondary or tertiary amino group. Where the amino group is tertiary it can, if desired, be cyclic, such as, for example, a piperidino group. R⁵ in the above formulas can be either aryl, substituted aryl or

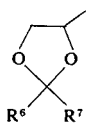

wherein R⁶ and R⁷ are independently selected and are alkyl groups, preferably alkyl groups having from one to four carbon atoms, as described above. It is preferred that R⁶ and R⁷ be the same and most preferred that they both be methyl. Where R⁵ is aryl, it is preferably phenyl or naphthyl. If it is a substituted aryl group, it can be substituted with alkyl groups, preferably having from 1 to 10 carbon atoms, especially from 1 to 5 carbon atoms, e.g., methyl, ethyl, propyl, butyl, pentyl, hexyl, heptyl, octyl, nonyl, decyl or isomers thereof. Other substitutents on the aryl group can be carboxyl groups, alkoxycarbonyl groups, e.g., methoxycarbonyl, ethoxycarbonyl, propoxycarbonyl, etc., and other similar substitutents well-known to those of ordinary skill in the art.

Especially preferred reductones for use in the practice of this invention include 5,6-isopropylidene ascorbic acid, 2-hydroxy-3-piperidino-5-methyl-cyclopent-2-ene-1-one, 3,4-dihydroxy-5-phenyl-2,5-dihydro-2-furanone, 5-imino-3,4-dihydroxy-2-phenyl-2,5-dihydrofuran, 2-isopropyl-4,5,6-trihydroxy pyrimidine and 4,5-dihydroxy-1-methyl-2-propyl-6-pyrimidone.

It is preferred that the reductone be present in a concentration of from about 2 to about 25 percent by weight based upon the weight of the leuco dye. The most preferred weight percent range for the reductone, based upon the weight of the leuco compound, is from about 5 to about 20.

The materials with which the foregoing reductones are employed are leuco dye-containing photographic elements and leuco dye-containing precursors for such elements. By "precursor" is meant a component of the photographic element prior to its actual incorporation into the element, for example, a coating solution containing one or more leuco dyes prior to its coating onto a suitable substrate.

The leuco dyes employed in the practice of this invention and the preferred photooxidants to be used therewith have been described in U.S. Pat. No. 3,615,568. Representative dyes in the leuco form which are within the scope of this invention include:

a. Aminotriarylmethanes
bis(4-amino-2-butylphenyl) (p-dimethylaminophenyl)methane
bis(4-amino-2-chlorophenyl) (p-aminophenyl)methane
bis(4-amino-3-chlorophenyl) (o-chlorophenyl)methane
bis(4-amino-3-chlorophenyl)phenylmethane
bis(4-amino-3,5-diethylphenyl) (o-chlorophenyl)methane
bis(4-amino-3,5-diethylphenyl) (o-ethoxyphenyl)methane
bis(4-amino-3,5-diethylphenyl) (P-methoxyphenyl)methane
bis(4-amino-3,5-diethylphenyl)phenylmethane
bis(4-amino-ethylphenyl) (o-chlorophenyl)methane
bis(p-aminophenyl) (4-amino-m-tolyl)methane
bis(p-aminophenyl) (o-chlorophenyl)methane
bis(p-aminophenyl) (p-chlorophenyl)methane
bis(p-aminophenyl) (2,4-dichlorophenyl)methane
bis(p-aminophenyl) (2,5-dichlorophenyl)methane
bis(p-aminophenyl) (2,6-dichlorophenyl)methane
bis(p-aminophenyl)phenylmethane 9-methylacridine
bis(4-amino-tolyl) (p-chlorophenyl)methane
bis(4-amino-o-tolyl) (2,4-dichlorophenyl)methane
bis(p-anilinophenyl) (4-amino-m-tolyl)methane bis(4-benzylamino-2-cyanophenyl) (p-aminophenyl)methane
bis(p-benzylethylaminophenyl) (p-chlorophenyl)methane
bis(p-benzylethylaminophenyl) (p-diethylaminophenyl)methane
bis(p-benzylethylaminophenyl) (p-dimethylaminophenyl)methane
bis(4-benzylethylamino-o-tolyl) (p-methoxyphenyl)methane
bis(p-benzylthylaminophenyl)phenylmethane
bis(4-benzylethylamino-o-tolyl) (o-chlorophenyl)methane
bis(4-benzylethylamino-o-tolyl) (p-diethylaminophenyl)methane
bis(4-benzylethylamino-o-tolyl) (4-diethylamino-o-tolyl)methane
bis(4-benzylethylamino-o-tolyl) (p-dimethylaminophenyl)methane
bis[2-chloro-4-(2-diethylaminoethyl)ethylaminophenyl]-(o-chlorophenyl)methane
bis[p-bis(2-cyanoethyl)aminophenyl]phenylmethane
bis[p-(2-cyanoethyl)ethylamino-o-tolyl] (p-dimethylaminophenyl)methane
bis[p-(2-cyanoethyl)methylaminophenyl] (p-diethylaminophenyl)methane
bis(p-dibutylaminophenyl) [p-(2-cyanoethyl)methylaminophenyl]methane
bis(p-dibutylaminophenyl) (p-diethylaminophenyl)methane
bis(4-diethylamino-2-butoxyphenyl) (p-diethylaminophenyl)methane
bis(4-diethylamino-2-fluorophenyl)o-tolylmethane
bis(p-diethylaminophenyl) (p-aminophenyl)methane
bis(p-diethylaminophenyl) (4-anilino-1-naphthyl)methane
bis(p-diethylaminophenyl) (m-butoxyphenyl)methane
bis(p-diethylaminophenyl) (o-chlorophenyl)methane
(p-diethylaminophenyl) (p-cyanophenyl)methane
bis(p-diethylaminophenyl) (o-chlorophenyl)methane
bis(p-diethylaminophenyl) (p-cyanophenyl)methane
bis(p-diethylaminophenyl) (2,4-dichlorophenyl)methane
bis(p-diethylaminophenyl) (4-diethylamino-1-naphthyl)methane
bis(p-diethylaminophenyl) (p-dimethylaminophenyl)methane
bis(p-diethylaminophenyl) (4-ethylamino-1-naphthyl)methane
bis(p-diethylaminophenyl)2-naphthylmethane
bis(p-diethylaminophenyl) (p-nitrophenyl)methane
bis(p-diethylaminophenyl) 2-pyridylmethane
bis(p-diethylamino-m-tolyl) (p-diethylaminophenyl)methane
bis(4-diethylamino-o-tolyl) (o-chlorophenyl)methane
bis(4-diethylamino-o-tolyl) (p-diethylaminophenyl)methane
bis(4-diethylamino-o-tolyl) (p-diphenylaminophenyl)methane
bis(4-diethylamino-o-tolyl)phenylmethane
bis(4-dimethylamino-2-bromophenyl)phenylmethane
bis(p-dimethylaminophenyl) (4-anilino-1-naphthyl)methane
bis(p-dimethylaminophenyl) (p-butylaminophenyl)methane
bis(p-dimethylaminophenyl) (p-sec. butylethylaminophenyl)methane
bis(p-dimethylaminophenyl) (p-chlorophenyl)methane
bis(p-dimethylaminophenyl) (p-diethylaminophenyl)methane
bis(p-dimethylaminophenyl) (4-dimethylamino-1-naphthyl)methane
bis(p-dimethylaminophenyl) (6-dimethylamino-m-tolyl)methane
bis(p-dimethylaminophenyl) (4-dimethylamino-o-tolyl)methane
bis(p-dimethylaminophenyl) (4-ethylamino-1-naphthyl)methane
bis(p-dimethylaminophenyl) (p-hexyloxyphenyl)methane
bis(p-dimethylaminophenyl) (p-methoxyphenyl)methane
bis(p-dimethylaminophenyl) (5-methyl-2-pyridyl)methane
bis(p-dimethylaminophenyl)2-quinolylmethane
bis(p-dimethylaminophenyl)o-tolylmethane
bis(p-dimethylaminophenyl) (1,3,3-trimethyl-2-indolinylidenemethyl)methane
bis(4-dimethylamino-o-tolyl) (p-aminophenyl)methane
bis(4-dimethylamino-o-tolyl) (o-bromophenyl)methane
bis(4-dimethylamino-o-tolyl) (o-cyanophenyl)methane
bis(4-dimethylamino-o-tolyl) (o-fluorophenyl)methane
bis(4-dimethylamino-o-tolyl)1-naphthylmethane
bis(4-dimethylamino-o-tolyl)phenylmethane
bis(p-ethylaminophenyl) (o-chlorophenyl)methane
bis(4-ethylamino-m-tolyl) (o-methoxyphenyl)methane
bis(4-ethylamino-m-tolyl) (p-methoxyphenyl)methane
bis(4-ethylamino-m-tolyl) (p-dimethylaminophenyl)-methane
bis(4-ethylamino-m-tolyl) (p-hydroxyphenyl)methane
bis[4-ethyl (2-hydroxyethyl)amino-m-tolyl](p-diethylaminophenyl)methane
bis[p-(2-hydroxyethyl)aminophenyl](o-chlorophenyl)methane
bis[p-bis(2-hydroxyethyl)aminophenyl](4-diethylamino-o-tolyl)methane
bis[p-(2-methoxyethyl)aminophenyl]phenylmethane
bis(p-methylaminophenyl) (o-hydroxyphenyl)methane
bis(p-propylaminophenyl) (m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-t-butylaminophenyl)methane
tris(p-dimethylaminophenyl)methane
tris(4-diethylamino-2-chlorophenyl)methane
tris(p-diethylaminophenyl)methane tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane b. Aminoxanthenes
3-amino-6-dimethylamino-2-methyl-9-(o-chlorophenyl)xanthene
3-amino-6-dimethylamino-2-methyl-9-phenylxanthene
3-amino-6-dimethylamino-2-methylxanthene
3,6-bis(diethylamino)-9-(o-chlorophenyl)xanthene
3,6-bis(diethylamino)-9-hexylxanthene
3,6-bis(diethylamino)-9-(o-methoxycarbonylphenyl)xanthene
3,6-bis(diethylamino)-9-methylxanthene
3,6-bis(diethylamino)-9-phenylxanthene
3,6-bis(diethylamino)-9-o-tolyxanthene
3,6-bis(dimethylamino)9-(o-chlorophenyl)xanthene
3,6-bis(dimethylamino)-9-ethylxanthene
3,6-bis(dimethylamino)-9-(o-methoxycarbonylphenyl)xanthene
3,6-bis(dimethylamino)-9-methylxanthene c. Aminothioxanthenes
3,6-bis(diethylamino)-9-(o-ethoxycarbonylphynyl)thioxanthene
3,6-bis(dimethylamino)-9-(o-methoxycarbonylphenyl)thioxanthene
3,6-bis(dimethylamino)thioxanthene
3,6-dianilino-9-(o-ethoxycarbonyphenyl)thioxanthene d. Amino-9,10-dihydroacridines
3,6-bis(benzylamino)-9,10-dihydro-9-methylacridine
3,6-bis(diethylamino)-9-hexyl-9,10-dihydroacridine
3,6-bis(diethylamino)-9,10-dihydro-9-methylacridine
3,6-bis(diethylamino)-9,10-dihydro-9-phenylacridine
3,6-diamino-9-hexyl-9,10-dihydroacridine
3,6-diamino-9,10-dihydro-9-methylacridine
3,6-diamino-9,10-dihydro-9-phenylacridine
3,6-bis(dimethylamino)-9-hexyl-9,10-dihydroacridine
3,6-bis(dimethylamino)-9,10-dihydro-9-methylacridine e. Aminophenoxazines
3,7-bis(diethylamino)phenoxazine
9-dimethylamino-benzo[a]phenoxazine f. Aminophenothiazines
3,7-bis(benzylamino)phenothiazine g. Aminodihydrophenazines
3,7-bis(benzylethylamino)-5,10-dihydro-5-phenylphenanzine
3,7-bis(diethylamino)-5-hexyl-5,10-dihydrophenazine
3,7-bis(dihexylamino)-5,10-dihydrophenazine
3,7-bis(dimethylamino)-5-(p-chlorophenyl)-5,10-dihydrophenazine
3,7-diamino-5-(o-chlorophenyl)-5,10-dihydrophenazine
3,7-diamino-5,10-dihydrophenazine
3,7-diamino-5,10-dihydro-5-methylphenazine
3,7-diamino-5-hexyl-5,10-dihydrophenazine 3,7-bis(dimethylamino)-5,10-dihydrophenazine
3,7-bis(dimethylamino)-5,10-dihydro-5-phenylphenazine
3,7-bis(dimethylamino)-5,10-dihydro-5-methylphenazine h. Aminodiphenylmethanes
1,4-bis[bis-p(diethylaminophenyl)methyl]piperazine
bis(p-diethylaminophenyl)anilinomethane
bis(p-diethylaminophenyl)-1-benzotriazolylmethane
bis(p-diethylaminophenyl)-2-benzotriazolylmethane
bis(p-diethylaminophenyl) (p-chloroanilino)methane
bis(p-diethylaminophenyl) (2,4-dichloroanilino)methane
bis(p-diethylaminophenyl) (methylamino)methane
bis(p-diethylaminophenyl) (octadecylamino)methane
bis(p-dimethylaminophenyl)aminomethane
bis(p-dimethylaminophenyl)anilinomethane
1,1-bis(dimethylaminophenyl)ethane
1,1-bis(dimethylaminophenyl)heptane
bis(4-methylamino-m-tolyl)aminoethane i. Leuco indamines
4-amino-4'-dimethylaminodiphenylamine
p-(p-dimethylaminoanilino)phenol j. Aminohydrocinnamic acids (cyanoethanes, leuco methines)
4-amino-$\alpha,\beta$-dicyanohydrocinnamic acid, methyl ester
4-anilino-$\alpha,\beta$-dicyanohydrocinnamic acid, methyl ester
4-(p-chloroanilino)-$\alpha,\beta$-dicyanohydrocinnamic acid, methyl ester
$\alpha$-cyano-4-dimethylaminohydrocinnamide
$\alpha$-cyano-4-dimethylaminohydrocinnamic acid, methyl ester
$\alpha,\beta$-dicyano-4-diethylaminohydrocinnamic acid, methyl ester
$\alpha,\beta$-dicyano-4-dimethylaminohydrocinnamide
$\alpha,\beta$-dicyano-4-dimethylaminohydrocinnamic acid, methyl ester
$\alpha,\beta$-dicyano-4-dimethylaminohydrocinnamic acid
$\alpha,\beta$-dicyano-4-dimethylaminohydrocinnamic acid, hexyl ester
$\alpha,\beta$-dicyano-4-hexylaminohydrocinnamic acid, methyl ester
$\alpha,\beta\beta$-dicyano-4-hexylaminohydrocinnamic acid, methyl ester
$\alpha,\beta$-dicyano-4-methylaminocinnamic acid, methyl ester p-(2,2-dicyanoethyl)-N,N-dimethylaniline
4-methoxy-4'-(1,2,2-tricyanoethyl)azobenzene
4-(1,2,2-tricyanoethyl)azobenzene
p-(1,2,2-tricyanoethyl)-N,N-dimethylaniline k. Hydrazines
1-(p-diethylaminophenyl)-2-(2-pyridyl)hydrazine
1-(p-dimethylaminophenyl)-2-(2-pyridyl)hydrazine
1-(3-methyl-2-benzothiazolyl)-2-(4-hydroxy-1-naphthyl)hydrazine
1-(2-naphthyl)-2-phenylhydrazine
1-p-nitrophenyl-2-phenylhydrazine
1-(1,3,3-trimethyl-2-indolinyl)-2-(3-N-phenylcarbamoyl-4-hydroxy-1-naphthyl)hydrazine l. leuco indigoid dyes m. Amino-2,3-dihydroanthraquinones
1,4-dianilino-2,3-dihydroanthraquinone
1,4-bis(ethylamino)-2,3-dihydroanthraquinone n. Phenethylanilines
N-(2-cyanoethyl)-p-phenethylaniline
N,N-diethyl-p-phenylethylaniline N,N-dimethyl-p-[2-(1-naphthyl)ethyl]aniline The preferred photooxidizers are inert until exposed to actinic radiation such as visible, ultraviolet, infrared, X-ray, electron beams, etc. Various photooxidizers have different peak sensitivities throughout the spectrum depending on the structure of the compound. As such, the specific photooxidizer selected is dependent on the nature of the actinic radiation. When exposed to such radiation, the photooxidizer produces an oxidizing agent which oxidizes the color generator to a colored form. Typical photooxidizers have one of the general formulas:

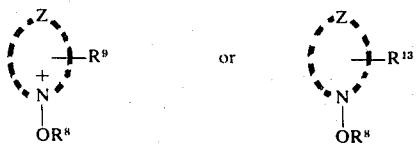

wherein
$R^9$ can be any of the following:
a. a methane linkage terminated by a heterocyclic nucleus of the type contained in cyanine dyes, e.g., those set forth in Mees and James, "The Theory of the Photographic Process," MacMillan, 3rd ed. pp. 198–232; the methine linkage can be substituted or unsubstituted, e.g., —CH=, —C(CH$_3$)=, —C(C$_6$H$_5$)=, —CH=CH—, —CH=CH-CH=, etc.;
b. alkyl preferably containing one to eight carbon atoms including substituted alkyl;
c. aryl including substituted aryl such as phenyl, naphthyl, tolyl, etc.;
d. hydrogen;
e. acyl having the formula

wherein $R^{14}$ is hydrogen or alkyl preferably having one to eight carbon atoms;
f. an anilinovinyl radical such as a radical having the formula:

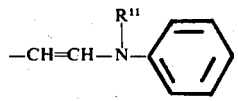

wherein $R^{11}$ is hydrogen, acyl or alkyl; or
g. styryl including substituted styryl, e.g.,

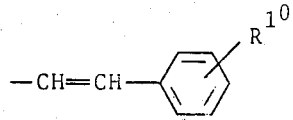

wherein $R^{10}$ is hydrogen, alkyl, amino, including dialkylamino such as dimethylamino;
$R^{13}$ can be either of the following:
a. a methine linkage terminated by a heterocyclic nucleus of the type contained in merocyanine dyes, e.g., those set forth in Mees and James (cited above); the methane linkage can be substituted or unsubstituted; or b. allylidene including substituted allylidene such as cyanoallylidene, alkylcarboxyallylidene or alkylsulfonylallylidene;
$R^8$ can be either:
a. alkyl preferably having one to eight carbon atoms such as methyl, propyl, ethyl, butyl, etc., including substituted alkyl such as sulfoalkyl, e.g., —(CH$_2$)$_3$SO$_3$—, aralkyl, e.g., benzyl or pyridinato-oxyalkyl salt, e.g., —(CH$_2$)$_3$—O—Y wherein Y is substituted or unsubstituted pyridinium salt; or etc.,
b. acyl, e.g.,

wherein $R^{12}$ is alkyl preferably having one to eight carbon atoms or aryl, e.g., methyl, ethyl, propyl, butyl, phenyl, naphthyl, etc.
Z represents the atoms necessary to complete a five to six-membered heterocyclic nucleus including a substituted heterocyclic nucleus which nucleus contain at least one additional heteroatom such as oxygen, sulfur, selenium or nitrogen, e.g., a pyridine nucleus, a quinoline nucleus, etc.;
and
$X^{\ominus}$ represents an acid anion, e.g., chloride, bromide, iodide, perchlorate, sulfamate, thiocyanate, p-toluenesulfonate, methyl sulfate, tetrafluoroborate, etc.

Typical photooxidants include the following:
1. 3-ethyl-1'-methoxyoxa-2'-pyridocarbocyanine perchlorate
2. 1'-ethoxy-3-ethyloxa-2'-pyridocarbocyanine tetrafluoroborate
3. 3'-ethyl-1-methoxy-2-pyridothiacyanine iodide
4. 1-ethoxy-3'-ethyl-2-pyridothiacyanine tetrafluoroborate
5. 1-benzyloxy-3'-ethyl-2-pyridothiacyanine iodide
6. 3'-ethyl-1-methoxy-2-pyridothiacarbocyanine iodide
7. 1-ethoxy-3'-ethyl-2-pyridothiacarbocyanine tetrafluoroborate
8. anhydro-3'-ethyl-1-(3-sulfopropoxy)-2-pyridothiacarbocyanine hydroxide
9. 1-benzyloxy-3'-ethyl-2-pyridothiacarbocyanine perchlorate
10. 3'-ethyl-1-methoxy-2-pyridothiacarbocyanine perchlorate
11. 1'-methoxy-1,3,3-trimethylindo-2'-pyridocarbocyanine picrate
12. 3'-ethyl-1-methoxy-4',5'-benzo-2-pyridothiacarbocyanine perchlorate
13. 1-ethoxy-3'-ethyl-4',5'-benzo-2-pyridothiacarbocyanine tetrafluoroborate
14. 1'-ethoxy-3-ethyloxa-2'-carbocyanine tetrafluoroborate
15. 1'-ethoxy-3-ethylthia-2'-cyanine tetrafluoroborate
16. 1'-ethoxy-3-ethylthia-2'-carbocyanine tetrafluoroborate
17. 1'-ethoxy-3-ethylthia-2'-dicarbocyanine tetrafluoroborate
18. 1-methoxy-3'-methyl-2-pyridothiazolinocarbocyanine perchlorate
19. 3'-ethyl-1-methoxy-4-pyridothiacyanine perchlorate 20. 3'-ethyl-1-methoxy-4-pyridothiacarbocyanine perchlorate
21. 1'-ethoxy-3-ethyl-4,5-benzothia-2'-carbocyanine tetrafluoroborate
22. 2-β-anilinovinyl-1-methoxypyridinium p-toluenesulfonate
23. 1-ethyl-1'-methoxy-4,5-benzothia-4'-carbocyanine perchlorate
24. 1-methoxy-2-methylpyridinium p-toluenesulfonate
25. 1-methoxy-4-methylpyridinium p-toluenesulfonate
26. anhydro-2-methyl-1-(3-sulfopropoxy)-pyridinimum hydroxide
27. 1-ethoxy-2-methylpyridinium tetrafluoroborate
28. 1-benzyloxy-2-methylpyridinium bromide
29. 1-ethoxy-2-methylquinolinium tetrafluoroborate
30. 1,1'-ethylenedioxybispyridinium dibromide
31. 1,1'-trimethylenedioxybispyridinium dibromide
32. 1,1'-tetramethylenedioxybis(2-methylpyridinium)dibromide
33. 1,1'-tetramethylenedioxybis(4-methylpyridinium)dibromide
34. 1,1'-tetramethylenedioxybispyridinium dibromide
35. 1,1-pentamethylenedioxybispyridinium dibromide
36. 1-acetoxy-2-(4-dimethylaminostyryl)pyridinium perchlorate
37. 1-benzoyloxy-2-(4-dimethylaminostyryl)-pyridinium perchlorate
38. 1,3-diethyl-5-[(1-methoxy-2(1H)-pyridylidene)ethylidene]-2-thiobarbituric acid
39. 3-ethyl-5-[(1-methoxy-2(1H)-pyridylidene)ethylidene]rhodanine
40. 1,3-diethyl-5-[(1-methoxy-2(1H)-pyridylidene)ethylidene]-barbituric acid
41. 2-(3,3-dicyanoalkylidene)-1-methoxy-1,2-dihydropyridine
42. 2-[(1-methoxy-2(1H)-pyridylidene)-ethylidene]-benzo[b]thiophen-3(2H)-one-1,1-dioxide
43. 3-cyano-5-[(1-methoxy-2(1H)-pyridylidene)ethylidene]4-phenyl-2(5H)-furanone
44. N-ethoxy-2-picolinium iodide
45. N-ethoxy-2-picolinium hexafluorophosphate
46. N-methoxy-2-anilinovinylpyridinium paratoluenesulfonate The photosensitive elements can be prepared from these leuco dyes and photooxidizers in the usual manner, i.e., by blending a dispersion or solution of the color generator and photooxidizer together with a binder, when necessary or desirable, and coating, impregnating or forming a self-supporting layer from the photosensitive composition.

Binders which can be added to the composition are materials that serve to adhere the leuco dye photooxidizer mixture to a substrate. The binder may also serve to thicken the solution of the composition should this be desirable for specific applications. Representative binders that are suitable for use in the present composition include: styrene-butadiene copolymers; silicone resins; styrene-alkyd resins; silicone-alkyd resins; soya-alkyd resins; poly(vinyl chloride); poly(vinylidene chloride); vinylidene chlorideacrylonitrile copolymers; poly(vinyl acetate); vinyl acetatevinyl chloride copolymers; poly(vinyl acetals), such as poly(vinyl butyral); polyacrylic and methacrylic esters, such as poly(methylmethacrylate), poly(n-butylmethacrylate), poly(isobutylmethacrylate), etc.; polystyrene, nitrated polystyrene; polymethylstyrene; isobutylene polymers; polyesters, such as poly-(ethylenealkaryloxyalkylene terephthalate); phenolformaldehyde resins; ketone resins; polyamides; polycarbonates; polythiocarbonates; poly(ethyleneglycol-co-bis-hydroxyethoxyphenyl propane terephthalate); copolymers of vinyl haloarylates and vinyl acetate such as poly(vinyl-m-bromobenzoate-co-vinylacetate); ethyl cellulose, poly(vinyl alcohol), cellulose acetate, cellulose nitrate, chlorinated rubber, gelatin, etc. Methods of making resins of this type have been described in the prior art, for example, styrene-alkyd resins can be prepared according to the method described in U.S. Pat. Nos. 2,361,019 and 2,258,423. Suitable resins of the type contemplated for use are sold under such tradenames as Vitel PE-101, Cymac, Piccopale 100, Saran F-220, Lexan 105 and Lexan 145. Other types of binders which can be used include such materials as paraffin, mineral waxes, etc.

It is preferred that binders employed in the practice of this invention be poly(vinyl acetals), polyamides, or polyesters. An especially preferred binder composition has been disclosed by our co-workers Arcesi and Rauner in co-pending U.S. patent application Ser. No. 397,179 filed Sept. 14, 1973. These binders are crosslinkable polymers having inherent viscosities of at least 0.20 and consisting essentially of ester repeating units having from 98 to 55 mole percent (based on the total acid units of the polyester) of first dicarboxylic acid-derived repeating units containing non-aromatic vinyl unsaturation capable of providing crosslinking sites and from 2 to 45 percent (based on the total acid units of the polyester) of second dicarboxylic acid-derived repeating units of the formula

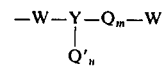

wherein
W is a carbonyl group;
n and m are integers whose sum equals 1;
Q is defined by the formula

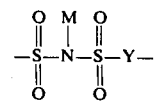

Q' is defined by the formula

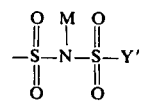

Y is an aromatic group;
Y' is an aromatic group or an alkyl group having from 1 through 12 carbon atoms; and
M is a solubilizing cation.

Generally, these copolyesters are formed by condensing one or more polyhydric alcohols with at least two carboxylic acids each containing at least two condensation sites. At least one of the carboxylic acids contains at least one site of nonaromatic ethylenic unsaturation while a remaining carboxylic acid contains a solubilizing sulfonate substituent. As employed herein the term "non-aromatic ethylenic unsaturation" is inclusive of carbon to carbon double bonding in both aliphatic and alicyclic moieties. It is, of course, recognized that amido groups can be used as linking groups rather than ester groups. This modification is readily achieved by condensing in the presence of amino alcohols, diamines or amino acids. The carboxylic acids can be condensed in the form of a free acid or in the form of a functional derivative, such as an anhydride, a lower alkyl ester or an acid halide.

In one preferred form the repeating units (I) are light-sensitive units of the type disclosed by Schellenberg and Bayer in U.S. Pat. No. 3,030,208 issued Apr. 17, 1962. These repeating units contain at least two condensation sites at least one of which is derived from a group of the formula (A) 

bonded directly to an aromatic nucleus. $R^{14}$ can be, for instance, a hydroxyl group where the compound is a free acid, an oxy atom linkage where the compound is an acid anhydride, a halogen atom where the compound is in the form of an acid halide or an alkoxy radical where the compound is in the form of an ester.

The repeating units (I) containing the groups (A) are preferably formed from cinnamic acid and its derivatives. Such compounds can be generically defined by the formula (B) 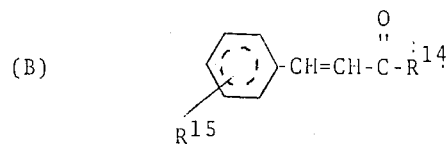

wherein $R^{14}$ is as previously defined and $R^{15}$ represents one or more alkyl, aryl, aralkyl, alkoxy, nitro, amino, acrylic or carboxyl groups or hydrogen or halogen atoms and is chosen to provide at least one condensation site. To increase the concentration of light-sensitive groups (A), in a specific preferred form $R^{15}$ is chosen to provide at least one additional group of the formula (A). A preferred compound for forming the repeating units (I) is p-phenylene diacrylic acid or a derivative thereof. Other useful compounds are disclosed by Schellenberg and Bayer, cited above. Still other compounds which can be used to form the repeating units (I) are disclosed in Laakso U.S. Pat. No. 3,702,765, issued Nov. 14, 1972 and Allen U.S. Pat. No. 3,622,320. The disclosures of each of these patents are incorporated herein by reference.

In another preferred form, the repeating units (I) can be formed from dicarboxylic acids having the formula (C) 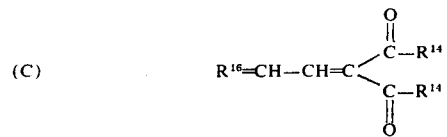

wherein $R^{16}$ represents an alkylidene, aralkylidene or heterocyclic group, or a derivative thereof and $R^{14}$ is as previously defined. Examples of diacids that correspond to the general formula (C) and that are particularly useful in the practice of the present invention include cinnamylidenemalonic acid, 2-butenylidenemalonic acid, 3-pentenylidenemalonic acid, o-nitrocinnamylidenemalonic acid, naphthylallylidenemalonic acid, 2-furfurylideneethylidenemalonic acid, N-methylpyridylidene-2-ethylidenemalonic acid, N-methylquinolidene-2-ethylidenemalonic acid, N-methylbenzothiazolylidene-2-ethylidenemalonic acid, and the like, as well as functional derivatives of these acids. Such acids are fully disclosed by Philipot et al. U.S. Pat. No. 3,674,745 issued July 4, 1972, the disclosure of which is incorporated herein by reference.

In still another preferred form, the repeating units (I) can be formed from muconic acid or a functional derivative thereof having the formula (D) 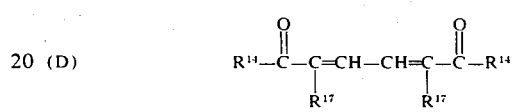

where $R^{14}$ is as previously defined and $R^{17}$ is a hydrogen atom or a methyl group. Exemplary muconic acids are trans, trans-muconic acid; cis, transmuconic acid; cis, cis-muconic acid; $\alpha,\alpha'$-cis, trans-dimethylmuconic acid, and $\alpha,\alpha'$-cis, cis-dimethylmuconic acid. These and other muconic acid compounds useful in forming repeating units (I) are more fully disclosed in McConkey U.S. Pat. No. 3,615,434 issued Oct. 26, 1971, the disclosure of which is incorporated herein by reference.

In an additional preferred form, the repeating units (I) can be formed from unsaturated carbocyclic dicarboxylic acids or their derivatives. Such compounds can be represented by the structural formula (E) 

wherein $R^{14}$ is as previously defined and $Z^1$ represents the atoms necessary to form an unsaturated, bridged or unbridged carbocyclic nucleus typically having 6 to 7 carbon atoms. Such a carbocyclic nucleus can be substituted or unsubstituted. Particularly suitable acid units are 4-cyclohexene-1,2-dicarboxylic acid, 5-nonbornene-2,3-dicarboxylic acid, hexachloro-5[2:2:1]bicycloheptene-2,3-dicarboxylic acid and the like. Such acids are fully disclosed in Canadian Pat. No. 824,096 issued Sep. 30, 1969, the disclosure of which is incorporated herein by reference.

The repeating units (I) containing the groups E can also be formed of cyclohexadiene dicarboxylic acid and its derivatives. Such compounds can be generically represented by the formula (F) 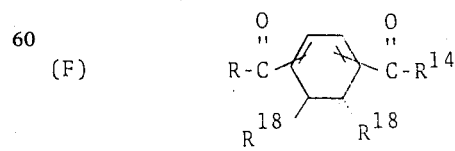

wherein each $R^{18}$ is a hydrogen atom, an alkyl group of 1 to 12 carbon atoms of branched or straight chain or cyclic configuration (e.g., methyl, ethyl, propyl, isopropyl, butyl, t-butyl, amyl, neopentyl, cyclohexyl, etc.) or an aryl group including mono- or poly-nuclear aryl groups such as phenyl, naphthyl, etc. The alkyl and aryl groups can be substituted with such substituents as do not interfere with the condensation reaction, such as halo, nitro, aryl, alkoxy, aryloxy and the like; $R^{14}$ is as previously defined and the carbonyl groups are attached to the cyclohexadiene nucleus meta or para to each other and preferably para. Particularly suited cyclohexadiene dicarboxylic acid units include 1,3-cyclohexadiene-1,4-dicarboxylic acid; 1,3-cyclohexadiene-1,3-dicarboxylic acid; 1,3-cyclohexadiene-1,2-dicarboxylic acid; 1,5-cyclohexadiene-1,4-dicarboxylic acid; 1,5-cyclohexadiene-1,3-dicarboxylic acid and alkylated and arylated derivatives of such dicarboxylic acids. Such acids as well as the functional derivatives thereof are fully disclosed in Belgian Pat. No. 754,892 issued Oct. 15, 1970, the disclosure of which is incorporated herein by reference.

The second repeating units (II) provided for the purpose of rendering the film-forming copolymer soluble in aqueous alkaline solutions before crosslinking can be formed from aromatic dicarboxylic acids or their derivatives including a disulfonamido group—i.e., a $-SO_2-N-SO_2-$ group— in which the amido nitrogen atom includes as an additional substituent a solubilizing cation. These aromatic dicarboxylic acids are preferably those characterized by the formula (G) 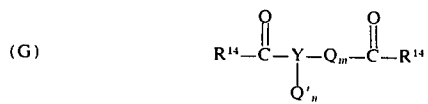

wherein
$R^{14}$ is as previously defined;
$m$ and $n$ are integers whose sum equals 1;
Q is defined by the formula (G-1) 

Q' is defined by the formula (G-2) 

Y is an aromatic group, such as an arylene group (e.g., phenylene, naphthylene, etc.) or arylidyne group (e.g. phenenyl, $C_6H_3$; naphthylidyne, $C_{10}H_5$; etc.);

Y' is an alkyl or aromatic group, such as an aryl, alkaryl or aralkyl group, in which each of the alkyl moieties includes from 1 through 12 carbon atoms and, preferably, from 1 through 6 carbon atoms; and M is a solubilizing cation and preferably a monovalent cation such as an alkali metal or ammonium cation.

Compounds preferred for use in forming repeating units (II) are: 3,3'-[(sodio-imino)disulfonyl]dibenzoic acid; 3,3'-[(potassium-imino)disulfonyl]dibenzoic acid; 3,3'-[(lithium-imino)disulfonyl]dibenzoic acid; 4,4'-[(lithium-imino)disulfonyl]dibenzoic acid; 4,4'-[(sodio-imino)disulfonyl]dibenzoic acid; 4,4'-[(potassium-imino)disulfonyl]dibenzoic acid; 3,4'-[(lithium-imino)disulfonyl]dibenzoic acid, 3,4'-[(sodio-imino)-disulfonyl]dibenzoic acid; 5-[4-chloronaphth-1-ylsulfonyl-(sodio-imino)sulfonyl]isophthalic acid; 4,4'-[(potassium-imino)-disulfonyl]dinaphthoic acid; 5-[p-tolyl-sulfonyl-(potassium-imino)-sulfonyl]isophthalic acid; 4-[p-tolyl-sulfonyl-(sodio-imino)-sulfonyl]-1,5-naphthalene-dicarboxylic acid; 5-[n-hexylsulfonyl-(lithium imino)-sulfonyl)]-isophthalic acid; 2-[phenylsulfonyl-(potassium-imino)-sulfonyl]-terephthalic acid and functional derivatives thereof. These and other dicarboxylic acids useful in forming repeating units (II) of these condensation copolymers are disclosed in Caldwell and Jones U.S. Pat. No. 3,546,180 issued Dec. 8, 1970, the disclosure of which is incorporated herein by reference.

In a preferred form, these condensation copolymers incorporate from 98 to 55 mole percent repeating units (I) and from 2 to 45 mole percent repeating units (II), these mole percentages being based on the total acid units present. In a specific preferred form, the repeating units (I) account for from 97 to 85 mole percent while the repeating units (II) account for 3 to 15 mole percent of the copolymer, based on the total acid units present.

In addition to the dicarboxylic acid repeating units (I) and (II) intended to promote crosslinking and solubilization, respectively, these condensation copolymers can incorporate repeating units (III) to complete the acid units of the condensation polymer. In a preferred form, these repeating units can be formed from dicarboxylic acids or their derivatives defined by the formula (H) 

wherein $R^{14}$ is as previously defined, D is a divalent hydrocarbon radical. D is preferably an arylene or alkylene radical. The repeating units (III) preferably take the form of one or more carboxylic acids or functional derivatives thereof having from 3 to 20 carbon atoms. Preferred aromatic dicarboxylic acids useful in forming the repeating units (III) are phthalic acids, such as phthalic acid, isophthalic acid and terephthalic acid. Exemplary aliphatic dicarboxylic acids include malonic, succinic, glutaric, adipic, pimelic, suberic, azelaic, sebacic and other higher homolog dicarboxylic acids. Since the repeating units (III) serve neither to solubilize nor crosslink the condensation copolymer, they are, of course, optional. If included, they can comprise up to 43 mole percent of the copolymer, based on the total acid units present. Preferably the repeating units (III) comprise no more than 25 mole percent of the copolymer, based on the total acid units present.

The repeating units (I), (II), and (III) can be linked into a condenastion copolymer by repeating units (IV) derived from difunctional compounds capable of condensing with a carboxylic acid or a functional derivative thereof. In a preferred form repeating units (IV) can be formed using one or more diols of the formula (J)  $HO-R^{19}-OH$ wherein $R^{19}$ is a divalent organic radical generally having from about 2 to 12 carbon atoms and including hydrogen and carbon atoms and, optionally, ether oxygen atoms. Exemplary preferred $R^{19}$ radicals include hydrocarbon radicals, such as straight and branched chain alkylene radicals (e.g. ethylene, trimethylene, neopentylene, etc.), cycloalkylene radicals (e.g., cyclohexylene), cycloalkylenebisalkylene radicals (e.g., 1,4-cyclohexylenedimethylene), and arylene radicals (e.g., phenylene) and hydrocarbon-oxy-hydrocarbon radicals, such as alkylene-oxy-alkylene, alkylene-oxy-cycloalkylene-oxy-alkylene, and the like. Exemplary diols that can be utilized in preparing these condensation copolymers include ethylene glycol, diethylene glycol, 1,3-propanediol; 1,4-butanediol; 1,5-pentanediol; 1,6-hexanediol; 1,7-heptanediol; 1,8-octanediol, 1,9-nonanediol; 1,10-decanediol; 1,12-dodecanediol; neopentyl glycol; 1,4-cyclohexane dimethanol; 1,4-bis($\beta$-hydroxy ethoxy)cyclohexane and the like. The corresponding diamines can, if desired, be substituted for the diols in forming condensation copolymers. One or a mixture of diols and/or diamines can be used in forming the condensation copolymers.

As is well known, the formation of the copolymer by condensation inherently determines that the repeating units (IV) will approximately equal on a molar basis the sum of the number of repeating units (I), (II) and (III) present. As a practical matter, it is frequently desirable to utilize an excess of up to about 10 mole percent of the reactant forming the repeating units (IV). The preparation of the condensation copolymers can be accomplished using procedures generally known to those skilled in the art, such as, for example, those preparation procedures described in the patents cited and incorporated by reference above. Typically, the condensation copolymers are formed by mixing the reactants in the presence of a catalyst, such as butyl titanate, titanium isopropoxide, antimony oxide, strontium oxide, zinc acetate, and the like. The degree and duration of heating can be used to increase the degree of polymerization achieved. Typically, it is desirable that these condensation copolymers exhibit an inherent viscosity of from 0.2 to 1.0 and, most preferably, from 0.3 to 0.8.

Solvents which are inert toward the leuco dye, the reductone, the binder and the photo oxidizer are usually employed to dissolve these components and thereby mix them together and to provide a fluid medium for a convenient and ready application of the photosensitive composition to substrates. Among the solvents which may be employed in preparing the compositions of this invention are amides such as formamide, N,N-dimethylformamide, N,N-dimethylacetamide, alcohols such as methanol, ethanol, 1-propanol, 2-propanol, butanol; glycols such as acetone, 2-butanone, etc.; esters such as ethylacetate, ethylbenzoate, etc.; ethers such as tetrahydrofuran, dioxane, etc.; chlorinated aliphatic hydrocarbons such as methylene chloride, ethylene chloride, dichloroethane, etc.; aromatic hydrocarbons such as benzene, toluene, etc.; and other common solvents such as dimethylsulfoxide, o-dichlorobenzene, dicyanocyclobutane, 1-methyl-2-oxohexamethyleneimine, and various mixtures of the solvents.

In preparing the compositions disclosed herein, useful results are obtained when the leuco dye and photooxidizer are mixed in weight ratios within the range from about 10:1 to about 1:10. The preferred ratio range is 2:1 to 1:2. The binder, when used, is employed in an amount varying from about 0.5 part to 10 parts by weight per part of combined weight of leuco dye and photooxidizer. The combined weight of leuco dye and photooxidizer in the composition ranges from about 1 weight percent to about 99 weight percent. A preferred weight range is from about 2 weight percent to about 60 weight percent.

When the compositions are coated and dried, typical coating thicknesses can be from about 0.05 to 10.0 microns or greater, with thicknesses of from 0.1 to 5.0 microns being preferred for lithographic plate applications.

In applying the composition to a supporting substrate, the composition can be sprayed, brushed, applied by a roller or immersion coater, flowed over the surface, picked up by immersion, impregnated or spread by other means. Elements thus formed are dried at room temperature, under vacuum or at elevated temperature.

The elements are then exposed to a pattern of actinic radiation and the image is formed directly on the support. The exposure can be by contact printing techniques, by lens projection, by reflex, by bireflex, from an image-bearing original or any other known techniques.

Suitable support materials can be chosen from among a variety of materials which do not directly chemically react with the coating composition. Such support materials include fiber base materials such as paper, polyethylene-coated paper, polypropylene-coated paper, parchment, cloth, etc.; sheets and foils of such metals as aluminum, copper, magnesium, zinc, etc.; glass and glass coated with such metals as chromium, chromium alloys, steel, silver, gold, platinum, etc.; synthetic resin and polymeric materials such as poly(alkyl acrylates), e.g., poly(methyl methacrylate), polyester film base—e.g., poly(ethylene terephthalate), poly(vinyl acetals), polyamides—e.g., nylon and cellulose ester film base—e.g., cellulose nitrate, cellulose acetate, cellulose acetate propionate, cellulose acetate butyrate and the like.

Specific support materials which are useful in forming printing plates—particularly lithographic printing plates—include supports such as zinc, anodized aluminum, grained aluminum, copper and specially prepared metal and paper supports; superficially hydrolyzed cellulose ester films; and polymeric supports such as polyolefins, polyesters, polyamide, etc.

The supports can be preliminarily coated—i.e.; before receipt of the radiation-sensitive coating—with known subbing layers such as copolymers of vinylidene chloride and acrylic monomers—e.g., acrylonitrile, methyl acrylate, etc. and unsaturated dicarboxylic acids such as itaconic acid, etc.; carboxymethyl cellulose; gelatin; polyacrylamide; and similar polymer materials.

The support can also carry a filter or antihalation layer composed of a dyed polymer layer which absorbs the exposing radiation after it passes through the radiation-sensitive layer and eliminates unwanted reflection from the support. A yellow dye in a polymeric binder, such as one of the polymers referred to above as suitable subbing layers, is an especially effective antihalation layer when ultraviolet radiation is employed as the exposing radiation.

The exposed radiation-sensitive elements of this invention can be developed by flushing, soaking, swabbing or otherwise treating the radiation-sensitive layer with a solution (hereinafter referred to as a developer) which selectively solubilizes (i.e. transports) the unexposed areas of the radiation-sensitive layers. The developer is typically an aqueous alkaline solution having a pH in the range of from about 9 to 14. Basicity can be imparted to the developer by the incorporation of soluble inorganic basic compounds such as alkali metal hydroxides, phosphates, sulfates, silicates, carbonates and the like as well as combinations thereof. Alternatively or in combination, basic, soluble organic substances such as amines—e.g., triethanol amine, diethylene amine, diethylaminoethanol, etc.—can be incorporated.

In a preferred form the developer includes a miscible combination of water and alcohol as a solvent system. The proportions of water and alcohol can be varied widely but are typically within the range of from 20 to 80 percent by volume water and from 80 to 20 percent by volume alcohol, based on the total developer volume. Most preferably, the water content is maintained within the range of from 40 to 60 percent by volume, based on total volume, with the remainder of the solvent system consisting essentially of alcohol. Any alcohol or combination of alcohols that does not chemically adversely attack the radiation-sensitive coating during development and that is miscible with water in the proportions chosen for use can be employed. Exemplary of useful alcohols are glycerol, benzyl alcohol, 2-phenoxyethanol, 1,2-propanediol, sec-butyl alcohol and ethers derived from alkylene glycols—i.e. dihydroxy poly (alkylene oxides)—e.g., dihydroxy poly(ethylene oxide), dihydroxy poly(propylene oxide), etc.

It is recognized that the developer can, optionally, contain additional addenda. For example, the developer can contain dyes and/or pigments. Where the developer is being used to develop the image of a lithographic plate, it can be advantageous to incorporate into the developer anti-scumming and/or anti-blinding agents, as is well recognized in the art.

The element can then be treated in any known manner consistent with its intended use. For example, printing plates are typically subjected to desensitizing etches. Where the developed radiation-sensitive coating layer forms a resist layer, the element is typically subjected to acidic or basic etchants and to plating baths.

The following examples are included for a further understanding of the invention EXAMPLE 1 — Use of the Antioxidant in a Print-out Composition Contained in an Inert Binder Part A A light-sensitive dope composition was prepared as follows:

| | |
|---|---|
| Bakelite XYHL | 20.0 g |
| (Bakelite is a registered trademark of Union Carbide Corp. Bakelite XYHL is understood to be a poly(vinyl butyral) resin containing approximately 80.7 weight percent vinyl butyral groups, 19 weight percent vinyl alcohol groups and 0.3 weight percent vinyl acetate groups.) | |
| N-methoxy-4-methyl pyridinium p-toluenesulphonate (a print-out accelerator) | 0.4 g |
| Tris(N,N-dipropylaminophenyl)methane (a leuco dye susceptible to oxidation) | 0.2 g |
| Acetone | 180.0 ml |

On mixing the composition a short period of time to effect solution, the dope began to discolor. One mg. of the reductone 5,6-isopropylidene ascorbic acid was added to a ten ml. portion of the dope. The resulting solution was placed in a 25 ml. bottle and agitated for 24 hours. It was found that the reductone was effective in preventing any further dope discoloration.

Part B

Part A was repeated 5 times except that in each case 1.0 mg. of one of the following reductones was substituted for the 1 mg. of 5,6-isopropylidene ascorbic acid employed therein:

1. 2-hydroxy-3-piperidino-5-methyl-cyclopent-2-ene-1-one
2. 3,4-dihydroxy-5-phenyl-2,5-dihydro-2-furanone
3. 5-imino-3,4-dihydroxy-2-phenyl-2,5-dihydrofuran
4. 2-isopropyl-4,5,6-trihydroxy pyrimidine
5. 4,5-dihydroxy-1-methyl-2-propyl-6-pyrimidone Each of these reductones was found to be effective in preventing further dope discoloration.

Part C

Part A was repeated eleven times except that in each case 1 mg. of one of the following antioxidants known in the prior art and outside the scope of this invention was substituted for the 1 mg. of 5,6-isopropyidene ascorbic acid employed therein:

1. p-aminophenol
2. hydroquinone
3. 2,6-di-tert-butyl-p-cresol
4. 2,6-di-tert-butyl-p-anisole
5. p-methoxyphenol
6. m-dimethylaminophenol
7. triphenylstibine
8. phloroglucinol
9. N-methyl diphenylamine
10. urea
11. hexamethylenetetramine Among these 11 prior art antioxidants, only p-aminophenol was found to be effective in preventing further dope discoloration.

EXAMPLE 2 — Use of Reductone in Print-Out Compositions Contained in a Light-Sensitive Binder Part A The Preparation of Polyesters from Diethyl p-Phenylenediacrylate, Dimethyl 3,3'-[(Sodio-imino)disulfonyl]dibenzoate and 1,4-Bis($\beta$-hydroxyethoxy)cyclohexane A polyester was prepared as described in U.S. patent application Ser. No. 397,179 filed Sept. 14,1973.

0.007 mole of dimethyl 3,3'-[(sodio-imino)disulfonyl] dibenzoate, 0.093 mole diethyl p-phenylenediacrylate and 0.17 mole 1,4-($\beta$-hydroxyethoxy)cyclohexane were added in that order to a 200 ml. polymerization flask. The side arm of the flask was fitted with a cork and the flask itself fitted with a glass tube reaching the material in the flask such that nitrogen gas could be bubbled through the reaction mixture during the first stage of heating. The flask was also fitted with a Vigreux column for reflux return of high boiling material during this first heating stage, but such that the generated alcohols were distilled. The contents were melted by inserting the flask in a silicone oil bath held at 235°C. Two drops (1/20 ml.) of titanium isopropxide were added to the melt and the flask and contents were heated under reflux for 4 hours. the Vigreux column, inert gas tube and the cork were removed and the side arm connected to a vacuum system in series with two dry ice-acetone traps. A stainless steel crescent shaped stirrer, fitted with a vacuum tight ball joint, was inserted into the reaction melt to stir the polymer.

The pressure was gradually lowered to 0.05 mm Hg with stirring, at which pressure the polyester was stirred for 40 minutes, collecting distillate in the two dry-ice traps. A glassy amber polymer was obtained.

Part B

A light-sensitive composition was prepared as follows:

| | |
|---|---|
| Polyester prepared as in Part A | 63.0 g |
| 2(benzoylmethylene)-1-ethylnaptho-[1,2-d]thiazoline | 2.5 g |
| 2,6-di-tert.-butyl-p-cresol | 2.5 g |
| N-methoxy-4-methylpyridinium p-toluenesulphonate | 1.25g |
| Rhodamine 6G | 0.32g |
| 2(N-methylbenzothiazoylidene) methyldithioacetate | 1.25g |
| Tris (N,N-dipropylaminophenyl) methane | 1.25g |
| Dichloroethane | 2500.0ml |

The above formulation began to discolor on standing. To a 200-ml portion of the above composition was added 0.02 g. of 2-hydroxy-3-piperidino-5-methyl-cyclopent-2-ene-1-one. In an identical manner, to another 200-ml portion of the above composition was added 0.02 g. of 5,6-isopropylidene ascorbic acid. In both cases any further dope discoloration was prevented.

The three light-sensitive compositions described above were then whirl coated at 100 rpm on an anodized aluminum support until dry. The plates were then incubated for 2 weeks at 120°C. and 50% relative humidity. The plate prepared from the composition containing no reductone had adopted an overall violet tint. The plates prepared from the composition containing the reductones suffered no such discoloration and were identical in color to freshly prepared plates.

Example 3 — Use of other Leuco Dyes in a Print-Out Composition Contained in a Light-Sensitive Binder Example 2 was repeated except that the tris(N,N-dipropylaminophenyl)methane was successively replaced by tris(N,N-diethylaminophenyl)methane, tris(N,N-dimethylaminophenyl)methane and bis(N,N-diethylaminophenyl) (N,N-diethylamino-o-methylphenyl)methane. Results identical to those obtained in Example 2 were obtained.

The invention has been described in detail with particular reference to certain preferred embodiments thereof, but it will be understood that variations and modifications can be effected within the spirit and scope of the invention.

What is claimed is:

1. In combination with a leuco dye-containing photographic element which prints out to form an image upon exposure to radiation, a photooxidizer the improvement which comprises a stabilizer selected from the group consisting of reductones of the structure:

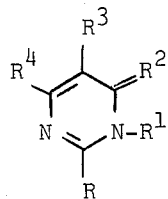

and

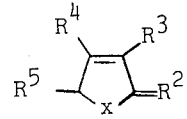

wherein $x$ is oxygen or alkylene having 1 or 2 carbon atoms, R and $R^1$ are independently selected from the group consisting of hydrogen and alkyl, $R^2$ is oxygen or an imino group, $R^3$ and $R^4$ are independently selected hydroxyl or amino groups, but at least one of $R^3$ and $R^4$ must be hydroxyl, $R^5$ is aryl, aryl substituted with alkyl, carboxyl or alkoxycarbonyl, or

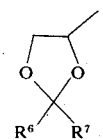

wherein $R^6$ and $R^7$ are independently selected alkyl groups

2. The combination of claim 1 wherein the reductone is present in a concentration of from about 2 to about 25 percent by weight based upon the weight of the leuco dye.

3. The combination of claim 1 wherein the reductone is selected from the group consisting of 5,6-isopropylidene ascorbic acid, 2-hydroxy-3-piperidino-5-methyl-cyclopent-2-ene-1-one, 3,4-dihydroxy-5-phenyl-2,5-dihydro-2-furanone, 5-imino-3,4-dihydroxy-2-phenyl-2,5-dihydrofuran, 2-isopropyl-4,5,6-trihydroxy pyrimidine and 4,5-dihydroxy-1-methyl-2-propyl-6-pyrimidone.

4. The combination of claim 1 further comprising a binder.

5. The combination of claim 4 wherein the binder is a polyester, a polyamide or a poly(vinylacetate).

6. In combination with a leuco dyecontaining photographic element which prints out to form an image upon exposure to radiation, a photooxidizer and a binder, the improvement which comprises from about 2 to about 25 percent by weight, based upon the weight of the leuco dye, of a stabilizer selected from the group consisting of reductones of the structure:

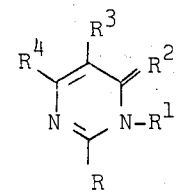

and

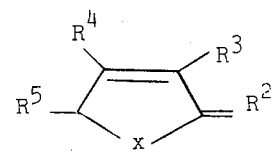

wherein x is oxygen or alkylene having one or two carbon atoms, R and R¹ are independently selected from the group consisting of hydrogen and alkyl, R² is oxygen or an imino group, R³ and R⁴ are independently selected hydroxyl or amino groups, but at least one of R³ and R⁴ must be hydroxyl, R⁵ is aryl, aryl substituted with alkyl, carboxyl or alkoxycarbonyl, or

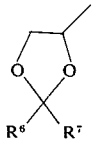

wherein R⁶ and R⁷ are independently selected alkyl groups 7. the combination of claim 6 wherein the reductone is selected from the group consisting of 5,6-isopropylidene ascorbic acid, 2-hydroxy-3-piperidino-5-methyl-cyclopent-2-ene-1-one, 3,4-dihydroxy-5-phenyl-2,5-dihydro-2-furanone, 5-imino-3,4-dihydroxy-2-phenyl-2,5-dihydrofuran, 2-isopropyl-4,5,6-trihydroxy pyrimidine and 4,5-dihydroxy-1-methyl-2-propyl-6-pyrimidone.

8. A combination of claim 5 wherein the binder is a polyester of diethyl-p-phenylene diacrylate, dimethyl-3,3'-dibenzoate and 1,4-bis(beta-hydroxyethoxy) cyclohexane.

* * * * *

UNITED STATES PATENT AND TRADEMARK OFFICE
CERTIFICATE OF CORRECTION

PATENT NO. : 3,920,457
DATED : November 18, 1975
INVENTOR(S) : M.P. Cunningham et al It is certified that error appears in the above-identified patent and that said Letters Patent are hereby corrected as shown below:

Column 22, line 42 "poly(vinylacetate)" should read --poly(vinylacetal)--; line 43, "dyecontaining" should read --dye-containing--.

Column 24, line 3, "the" should read --The--; line 14, after "3,3'-" should be inserted --[(sodio-imino)disulfonyl]--.

Signed and Sealed this twentieth Day of April 1976

[SEAL]

Attest:

RUTH C. MASON
Attesting Officer

C. MARSHALL DANN
Commissioner of Patents and Trademarks